(12) United States Patent
Harayama

(10) Patent No.: US 10,186,728 B2
(45) Date of Patent: Jan. 22, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Takashi Harayama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 434 days.

(21) Appl. No.: 14/934,485

(22) Filed: Nov. 6, 2015

(65) Prior Publication Data

US 2016/0133985 A1 May 12, 2016

(30) Foreign Application Priority Data

Nov. 7, 2014 (JP) .................... 2014-226609

(51) Int. Cl.
| | |
|---|---|
| *H01M 10/04* | (2006.01) |
| *H01M 2/02* | (2006.01) |
| *H01M 10/052* | (2010.01) |
| *H01M 10/0587* | (2010.01) |
| *H01M 10/0525* | (2010.01) |

(52) U.S. Cl.
CPC ..... *H01M 10/0431* (2013.01); *H01M 2/0217* (2013.01); *H01M 10/052* (2013.01); *H01M 10/0587* (2013.01); *H01M 10/0525* (2013.01); *H01M 2220/20* (2013.01); *Y02E 60/122* (2013.01); *Y02T 10/7011* (2013.01)

(58) Field of Classification Search
CPC ......... H01M 10/0431; H01M 10/0587; H01M 2/0217
See application file for complete search history.

(56) References Cited

U.S. PATENT DOCUMENTS

| | | |
|---|---|---|
| 2006/0154138 A1 | 7/2006 | Miyamoto et al. |
| 2011/0059344 A1 | 3/2011 | Kawase et al. |
| 2011/0111275 A1 | 5/2011 | Kawase |

FOREIGN PATENT DOCUMENTS

| | | |
|---|---|---|
| CN | 101978547 A | 2/2011 |
| JP | 2009-277443 A | 11/2009 |
| JP | 2012-74287 A | 4/2012 |
| JP | 2014-025850 A | 2/2014 |
| JP | 2014-154291 A | 8/2014 |

*Primary Examiner* — Ula C Ruddock
*Assistant Examiner* — Thomas H. Parsons
(74) *Attorney, Agent, or Firm* — Sughrue Mion, PLLC

(57) ABSTRACT

Provided is a nonaqueous electrolyte secondary battery including a flat wound electrode body. The flat wound electrode body has a flat portion, a first R portion, and a second R portion. The second R portion is provided on a bottom side of a battery case when a nonaqueous electrolytic solution is put into the battery case at least in a battery construction step. Opposite end portions of the second R portion in the winding axial direction are squashed in a thickness direction of the electrode body to a larger extent than opposite end portions of the first R portion in the winding axial direction.

4 Claims, 6 Drawing Sheets

NONAQUEOUS ELECTROLYTE SECONDARY BATTERY

INCORPORATION BY REFERENCE

The disclosure of Japanese Patent Application No. 2014-226609 filed on Nov. 7, 2014 including the specification, drawings and abstract is incorporated herein by reference in its entirety.

BACKGROUND OF THE INVENTION

1. Field of the Invention

The present invention relates to a nonaqueous electrolyte secondary battery including a flat wound electrode body.

2. Description of Related Art

A nonaqueous electrolyte secondary battery such as a lithium ion secondary battery (also referred to as "lithium ion battery") has a lighter weight and higher energy density than existing batteries. Therefore, a nonaqueous electrolyte secondary battery has been preferably used as a high-output power supply mounted on a vehicle or as a power supply for a PC or a portable device. In particular, a light-weight lithium ion secondary battery capable of obtaining high energy density is preferably used as a high-output power supply for driving a vehicle such as an electric vehicle (EV), a hybrid vehicle (HV), or a plug-in hybrid vehicle (PHV).

In a typical configuration of this nonaqueous electrolyte secondary battery, a structure is known in which an electrode body, which includes a positive electrode and a negative electrode with a separator interposed therebetween, and a nonaqueous electrolytic solution are accommodated in a battery case. In particular, in order to stably supply a high current, a nonaqueous electrolyte secondary battery used in a power supply for driving a vehicle includes a wound electrode body which is formed by making elongated belt-shaped positive and negative electrodes overlap each other with a separator interposed therebetween to obtain a laminate and winding the laminate. For example, Japanese Patent Application Publication No. 2014-154291 (JP 2014-154291 A) discloses a technique relating to this battery.

In this nonaqueous electrolyte secondary battery, a gap between the positive and negative electrodes in the wound electrode body is filled with an appropriate amount of the nonaqueous electrolytic solution, which contributes to the movement of charges between the positive and negative electrodes. On the other hand, when the inside of the wound electrode body is filled with an excess amount of the nonaqueous electrolytic solution, a decrease in performance such as an increase in battery resistance may occur. In a nonaqueous electrolyte secondary battery of the related art, when an excess amount of a nonaqueous electrolytic solution is supplied into a battery case by mistake, an excess amount of the residue of the nonaqueous electrolytic solution is likely to accumulate in a lower portion of the wound electrode body (that is, a portion of the electrode body that is positioned on the bottom of the battery case when the electrode body is accommodated in the battery case).

SUMMARY OF THE INVENTION

The invention provides a nonaqueous electrolyte secondary battery in which the residue of a nonaqueous electrolytic solution is appropriately discharged to the outside of a wound electrode body (an excess amount of the nonaqueous electrolytic solution is not penetrated into or held in the wound electrode body) to suppress an increase in resistance in a lower portion of the electrode body (in particular, an increase in resistance on a surface of a negative electrode).

According to an aspect of the invention, there is provided a nonaqueous electrolyte secondary battery including: a flat wound electrode body; a nonaqueous electrolytic solution; and a quadrilateral battery case that accommodates the flat wound electrode body and the nonaqueous electrolytic solution. The flat wound electrode body is formed by making an elongated belt-shaped positive electrode and an elongated belt-shaped negative electrode overlap each other with an elongated belt-shaped separator interposed therebetween to obtain a laminate and winding the laminate in a longitudinal direction of the positive electrode and the negative electrode, in which the flat wound electrode body has a flat portion, a first R portion, and a second R portion, the flat portion has a flat surface and is provided in a center portion in a longitudinal direction of a section of the electrode body perpendicular to a winding axis, and the first R portion and the second R portion have a curved surface and are provided in opposite end portions, between which the flat portion is interposed, in the longitudinal direction of the section. The second R portion is provided on a bottom side of the quadrilateral battery case when a nonaqueous electrolytic solution is put into the quadrilateral battery case at least in a battery construction step. Opposite end portions of the second R portion in the winding axial direction are squashed in a thickness direction of the electrode body to a larger extent than opposite end portions of the first R portion in the winding axial direction.

According to the flat wound electrode body (hereinafter, also referred to simply as "wound electrode body" or "electrode body"), the opposite end portions of the second R portion in the winding axial direction, which are portions where an excess amount of the residue of a nonaqueous electrolytic solution is likely to accumulate in the related art, are squashed (crushed) in advance. In the squashed portions, the distance between portions of the electrodes adjacent to each other (typically, current collectors) is short, and the squashed portions are in a closed state. Therefore, according to the flat wound electrode body having the above-described configuration, the residue of the nonaqueous electrolytic solution is appropriately discharged to the outside of the flat wound electrode body (an excess amount of the nonaqueous electrolytic solution is not penetrated into or held in the wound electrode body). Moreover, the residue of the nonaqueous electrolytic solution is prevented from returning from the outside of the flat wound electrode body to the inside, and the accumulation of an excess amount of the residue in the wound electrode body can be removed.

Typically, in the flat wound electrode body having the above-described configuration, the top (a lower end when the second R portion is provided on the bottom side of the quadrilateral battery case) of the previously squashed (crushed) opposite end portions of the second R portion in the winding axial direction are arranged below the other portions. That is, the top of the second R portion may be inclined downward to the opposite end portions. Due to this inclination, the residue of the nonaqueous electrolytic solution is appropriately discharged to the outside of the flat wound electrode body under the action of gravity (an excess amount of the nonaqueous electrolytic solution is not penetrated into or held in the wound electrode body).

In general, when an excess amount of the residue of the nonaqueous electrolytic solution accumulates in the wound electrode body (typically, a lower portion of the wound electrode body), for example, a film of a component derived from the nonaqueous electrolytic solution is continuously formed on a surface of the negative electrode, which may increase resistance. Examples of the component derived from the nonaqueous electrolytic solution include a component produced by decomposition of a supporting electrolyte (for example, $LiPF_6$) contained in the nonaqueous electrolytic solution. Alternatively, metal species (for example, lithium metal) constituting charge carriers are deposited on a surface of the negative electrode, which may cause a problem such as short-circuiting. In the nonaqueous electrolyte secondary battery according to the aspect, the accumulation of an excess amount of the residue of the nonaqueous electrolyte secondary battery in the wound electrode body is removed, and thus the occurrence of the above-described problem can be appropriately suppressed. In particular, an increase in electrical resistance in a lower portion of the wound electrode body (typically, an increase in the electrical resistance of a surface of the negative electrode corresponding to the lower portion) can be suppressed.

When a top of the opposite end portions of the first R portion in the longitudinal direction of the section is represented by a point A, a boundary surface between the first R portion and the flat portion is represented by a cross section B-C, a top of the opposite end portions of the second R portion in the longitudinal direction of the section is represented by a point H, and a boundary surface between the second R portion and the flat portion is represented by a cross section I-J, the opposite end portions of the second R portion in the winding axial direction may be squashed in the thickness direction of the electrode body such that a relationship between a distance a from the cross section B-C to the point A and a distance b from the cross section I-J to the point H satisfies a<b.

According to the flat wound electrode body having the above-described configuration, the distance between portions of the electrodes which constitute the electrode body adjacent to each other in or near the opposite end portions of the second R portion (that is, the distance between the portions of the electrodes adjacent to each other (laminated) in the wound electrode body, in other words, the distance between current collectors adjacent to each other) can be adjusted to a size which is appropriate for exhibiting the above-described effects.

When a length of the cross section B-C in the thickness direction of the electrode body in the opposite end portions of the first R portion is represented by c, a length of a cross section D-E parallel to the cross section B-C at a distance (0.5×a), which is half of the distance a from the cross section B-C to the point A, in the thickness direction of the electrode body is represented by d, a length of the cross section I-J in the thickness direction of the electrode body in the opposite end portions of the second R portion is represented by e, and a length of a cross section K-L parallel to the cross section I-J at a distance (0.5×b), which is half of the distance b from the cross section I-J to the point H, in the thickness direction of the electrode body is represented by f, the opposite end portions of the second R portion in the winding axial direction may be squashed in the thickness direction of the electrode body such that a relationship of "d/c>f/e" is satisfied. The flat wound electrode body may be configured such that a relationship between the length c, the length d, the length e, and the length f satisfies "d/c≥1.2×(f/e)".

According to the flat wound electrode body having the above-described configuration, the distance between the portions of the electrodes which constitute the electrode body in or near the opposite end portions of the second R portion can be adjusted to a size which is more appropriate for exhibiting the above-described effects.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
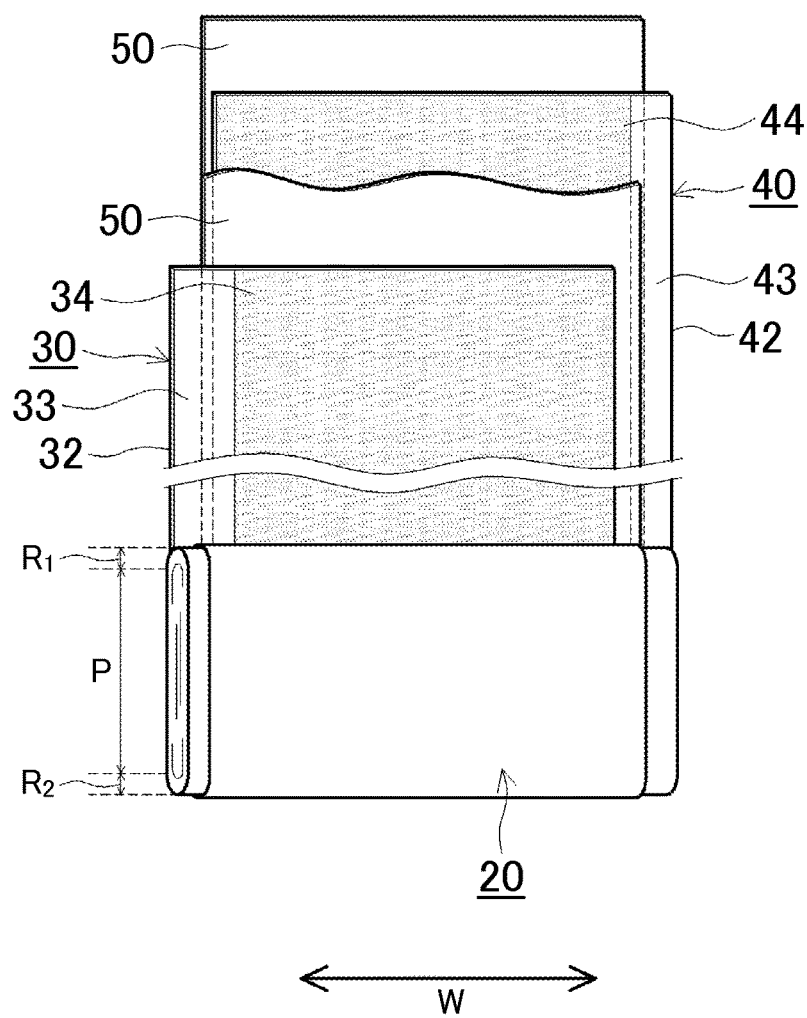
FIG. 1 is a diagram schematically showing a configuration of a flat wound electrode body of a nonaqueous electrolyte secondary battery according to an embodiment of the invention.

Hereinafter, a nonaqueous electrolyte secondary battery according to the invention will be described based on a preferable embodiment while appropriately referring to the drawings. Matters (for example, a battery structure which is not a characteristic of the invention) necessary to practice this invention other than those specifically referred to in this specification may be understood as design matters based on the related art in the pertinent field for a person of ordinary skill in the art. The invention can be practiced based on the contents disclosed in this description and common technical knowledge in the subject field. Parts or portions having the same function are represented by the same reference numerals. In each drawing, a dimensional relationship (for example, length, width, or thickness) does not reflect the actual dimensional relationship. However, the nonaqueous electrolyte secondary battery according to the invention is not intended to be limited to the following embodiment.

In this specification, "nonaqueous electrolyte secondary batteries" refer to all the batteries which can be repeatedly charged and discharged by using an nonaqueous electrolytic solution as an electrolyte. Typically, "nonaqueous electrolyte secondary batteries" include secondary batteries in which lithium (Li) ions are used as electrolyte ions (charge carriers), and charging and discharging are performed by the lithium ions moving between positive and negative electrodes. Secondary batteries which are generally called lithium ion secondary batteries are typical examples of the nonaqueous electrolyte secondary battery of this specification. In this specification, "active material" refers to a material which can reversibly store and release chemical species (for example, lithium ions) as charge carriers. In an embodiment described below, the invention is embodied by using a lithium ion secondary battery as the nonaqueous electrolyte secondary battery. The invention is applicable to nonaqueous electrolyte secondary batteries other than the lithium ion secondary battery (for example, nonaqueous electrolyte secondary batteries in which other metal species (sodium ions, magnesium ions, or the like) are used as charge carriers).

<Nonaqueous Electrolyte Secondary Battery>

Figure 3:
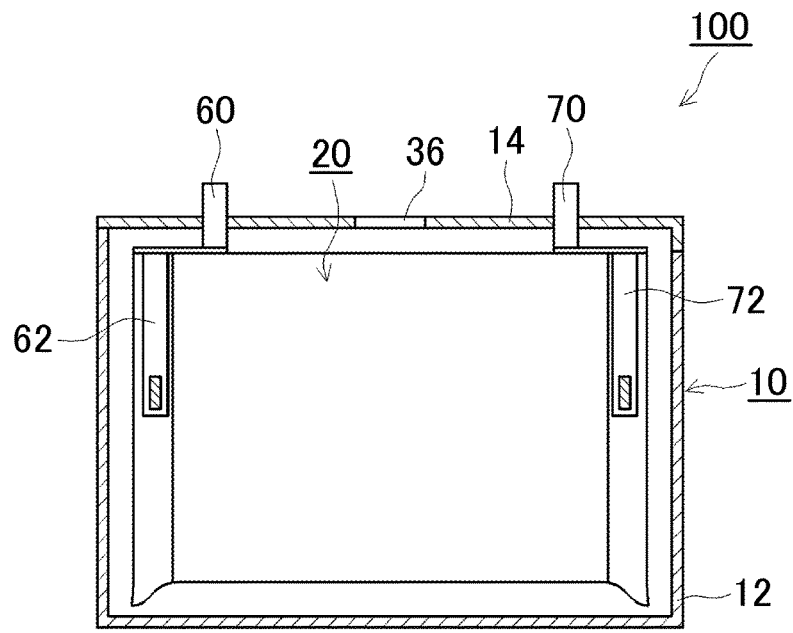
FIG. 3 is a diagram schematically showing a configuration of the nonaqueous electrolyte secondary battery according to the embodiment.
Figure 4:
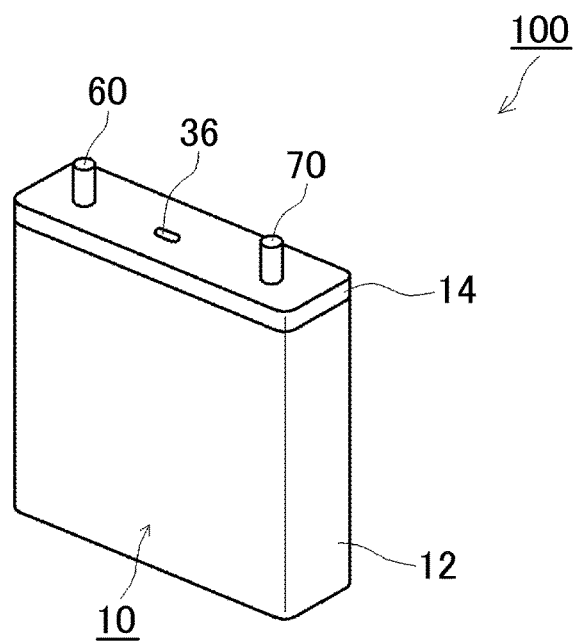
FIG. 4 is a perspective view schematically showing an external appearance of the nonaqueous electrolyte secondary battery according to the embodiment.

FIGS. 3 and 4 are diagrams showing a schematic configuration of a nonaqueous electrolyte secondary battery 100 according to a preferable embodiment of the invention. The nonaqueous electrolyte secondary battery 100 has a structure in which a wound electrode body 20 which is wound in a flat shape (flat wound electrode body 20) and a nonaqueous electrolytic solution (not shown) are accommodated in a battery case 10 having a flat cuboid shape (quadrilateral shape). In this specification, unless otherwise specified, up, down, right, and left positions are based on FIG. 3. The detailed description of FIGS. 3 and 4 will be made below. FIG. 1 is a diagram showing a configuration of the flat wound electrode body 20. The flat wound electrode body 20 is formed by arranging a belt-shaped positive electrode 30 and a belt-shaped negative electrode 40 with separators 50 interposed therebetween to obtain a laminate and winding the laminate such that a shape of a section perpendicular to a winding axis is elliptical. "Elliptical shape" described here includes a shape with four corners which are smoothly rounded (so-called, rounded rectangle).

<Positive Electrode>

As shown in FIG. 1, typically, the belt-shaped positive electrode 30 includes: a belt-shaped positive electrode current collector 32; and a positive electrode active material layer 34 that is held on the positive electrode current collector 32. Typically, a positive electrode current collector exposure portion 33 is provided in a belt shape on one end portion of the positive electrode current collector 32 along a longitudinal direction, and the positive electrode active material layer 34 is provided on a portion of the positive electrode current collector 32 excluding the positive electrode current collector exposure portion 33. The positive electrode active material layer 34 may be provided on both surfaces of the positive electrode current collector 32 or on only one of the surfaces. As the positive electrode current collector 32, a conductive member formed of highly conductive metal (for example, aluminum or nickel) is preferably used. The positive electrode active material layer 34 has a porous structure so as to be impregnated with the nonaqueous electrolytic solution.

The positive electrode active material layer 34 contains a positive electrode active material. When the nonaqueous electrolyte secondary battery according to the embodiment is a lithium ion secondary battery, as the positive electrode active material, a material capable of storing and releasing lithium ions, for example, a lithium-containing compound (for example, lithium transition metal composite oxide) containing lithium and one kind or two or more kinds of transition metal elements can be preferably used. Examples of lithium transition metal oxide include lithium nickel composite oxide (for example, $LiNiO_2$), lithium cobalt composite oxide (for example, $LiCoO_2$), lithium manganese composite oxide (for example, $LiMn_2O_4$), and a ternary lithium-containing composite oxide such as lithium nickel cobalt manganese composite oxide (for example, $LiNi_{1/3}Co_{1/3}Mn_{1/3}O_2$).

In addition to the positive electrode active material, the positive electrode active material layer 34 optionally contains one material or two or more materials which can be used as components of a positive electrode active material layer in a general nonaqueous electrolyte secondary battery. Examples of the material include a conductive material and a binder. As the conductive material, for example, carbon materials such as various carbon blacks (for example, acetylene black and Ketjen black), activated carbon, graphite, and carbon fiber can be preferably used. In addition, as the binder, for example, vinyl halide resins such as polyvinylidene fluoride (PVdF) or polyalkylene oxides such as polyethylene oxide (PEO) can be preferably used.

A ratio of the weight of the positive electrode active material to the total weight of the positive electrode active material layer 34 is not particularly limited but, from the viewpoint of realizing high energy density, is preferably 60 wt % or higher and more preferably 70 wt % or higher. For example, the content of the positive electrode active material in the positive electrode active material layer 34 is preferably 70 wt % to 95 wt %. In an embodiment in which the binder is used, a ratio of the weight of the binder to the total weight of the positive electrode active material layer 34 is not particularly limited but, from the viewpoint of retaining the shape, is usually suitably 0.5 wt % to 10 wt % and preferably 1 wt % to 5 wt %. In an embodiment in which the conductive material is used, a ratio of the weight of the conductive material to the total weight of the positive electrode active material layer 34 is not particularly limited but is suitably 1 wt % to 20 wt % and preferably 2 wt % to 10 wt %.

Although not particularly limited thereto, the thickness of the positive electrode active material layer 34 is, for example, 20 µm or more and typically 50 µm or more and is, for example, 200 µm or less and typically 100 µm or less. The weight (coating weight) of the positive electrode active material layer 34 per unit area of a single surface of the positive electrode current collector 32 may be 3 $mg/cm^2$ or more (for example, 5 $mg/cm^2$ or more; typically 7 $mg/cm^2$ or more) from the viewpoint of realizing high energy density. From the viewpoint of realizing high output characteristics, the weight of the positive electrode active material layer 34 per single surface of the positive electrode current collector 32 may be 100 $mg/cm^2$ or less (for example, 70 $mg/cm^2$ or less; typically 50 $mg/cm^2$ or less).

<Negative Electrode>

Typically, the belt-shaped negative electrode 40 includes: a belt-shaped negative electrode current collector 42; and a negative electrode active material layer 44 that is formed on the negative electrode current collector 42. Typically, a negative electrode current collector exposure portion 43 is provided in a belt shape on one end portion of the negative electrode current collector 42 along a longitudinal direction, and the negative electrode active material layer 44 is provided on a portion of the negative electrode current collector 42 excluding the negative electrode current collector exposure portion 43. The negative electrode active material layer 44 may be provided on both surfaces of the negative electrode current collector 42 or on only one of the surfaces. As the negative electrode current collector 42, a conductive member formed of highly conductive metal (for example, copper or nickel) is preferably used. The negative electrode active material layer 44 has a porous structure so as to be impregnated with the nonaqueous electrolytic solution.

The negative electrode active material layer 44 contains a negative electrode active material. As the negative electrode active material, various known materials which can be used as a negative electrode active material of a nonaqueous electrolyte secondary battery (for example, lithium ion secondary battery) can be used. Preferable examples of the negative electrode active material include carbon materials such as graphite, non-graphitizable carbon (hard carbon), graphitizable carbon (soft carbon), or carbon nanotube, and a material having a combination of the carbon materials. Among these, a graphite-based material such as natural graphite (plumbago) or artificial graphite is preferably used from the viewpoint of realizing high energy density. It is preferable that amorphous carbon is arranged on at least a portion of a surface of the graphite-based material. It is more preferable that substantially the entire region of a surface of granular carbon is coated with an amorphous carbon film.

In addition to the negative electrode active material, the negative electrode active material layer 44 optionally contains one material or two or more materials which can be used as components of a negative electrode active material layer 44 in a general nonaqueous electrolyte secondary battery. Examples of the material include a binder and various additives. As the binder, for example, the same binders as those described in the positive electrode 30 can be used. For example, when an aqueous solvent is used to form the negative electrode active material layer 44, rubbers such as styrene-butadiene rubber (SBR); and water-soluble or water-dispersible polymer materials such as polyethylene oxide (PEO) or vinyl acetate copolymers can be preferably used as the binder. Moreover, various additives such as a thickener, a dispersant, or a conductive material can be appropriately used. Examples of the thickener include cellulose polymers such as carboxymethyl cellulose (CMC), methyl cellulose (MC), and cellulose acetate phthalate (CAP).

A ratio of the weight of the negative electrode active material to the total weight of the negative electrode active material layer 44 is not particularly limited but, from the viewpoint of realizing high energy density, is preferably 50 wt % or higher and more preferably 90 wt % or higher (for example, 95 wt % or higher). For example, the content of the negative electrode active material in the negative electrode active material layer 44 is preferably 95 wt % to 99 wt %. In an embodiment in which the binder is used, a ratio of the weight of the binder to the total weight of the negative electrode active material layer 44 is not particularly limited but, from the viewpoint of retaining the shape, is usually suitably 0.5 wt % to 10 wt % and preferably 1 wt % to 5 wt %.

Although not particularly limited thereto, the thickness of the negative electrode active material layer 44 is, for example, 40 μm or more and typically 50 μm or more and is, for example, 100 μm or less and typically 80 μm or less. The weight (coating weight) of the negative electrode active material layer 44 per unit area of a single surface of the negative electrode current collector 42 may be 5 mg/cm$^2$ or more (typically, 7 mg/cm$^2$ or more) from the viewpoint of realizing high energy density. From the viewpoint of realizing high output characteristics, the weight of the negative electrode active material layer 44 per single surface of the negative electrode current collector 42 may be 20 mg/cm$^2$ or less (typically, 15 mg/cm$^2$ or less).

<Separator>

The separator 50 is a component that insulates the positive electrode 30 and the negative electrode 40 from each other, stores charge carriers, and can allow the permeation of charge carriers. The separator 50 can be preferably formed of a microporous resin sheet including various materials. The separator 50 may be configured to have a shutdown function of being softened and melted to block the permeation of charge carriers when the flat wound electrode body 20 reaches a predetermined temperature. For example, a microporous sheet formed of a polyolefin resin represented by polyethylene (PE) or polypropylene (PP) is preferably used as the separator 50 because the shutdown temperature can be set to be in a preferable range of 80° C. to 140° C. (typically 110° C. to 140° C.; for example, 120° C. to 135° C.).

The thickness of the separator 50 is not particularly limited, but is usually 10 μm or more and typically 15 μm or more (for example, 17 μm or more). The thickness of the separator 50 is usually 40 μm or less and typically 30 μm or less (for example, 25 μm or less). By adjusting the thickness of the separator 50 to be within the above-described range, the permeability of charge carriers can be maintained to be superior, and small short-circuiting (leakage current) is not likely to occur. Therefore, input and output densities and safety can be simultaneously realized at a high level.

<Flat Wound Electrode Body>

In order to obtain the flat wound electrode body according to the embodiment, first, the flat wound electrode body 20 shown in FIG. 1 is formed using the positive electrode 30, the negative electrode 40, and the separator 50 which are described above. That is, the elongated belt-shaped positive electrode 30, the belt-shaped negative electrode 40 are laminated with the two belt-shaped separators 50 interposed therebetween, and the obtained laminate is wound in the longitudinal direction. In other words, this laminate is wound with the width direction, perpendicular to the longitudinal direction, set as a winding axis W. At this time, a shape of a section of the electrode body perpendicular to the winding axis W is elliptical (flat). The flat wound electrode body 20 can be divided into three portions including: a flat portion P that has a flat surface and is formed in a center portion in a longitudinal direction of the section of the electrode body perpendicular to the winding axis W; a first R portion $R_1$ that has a curved surface and is formed in one of opposite end portions, between which the flat portion P is interposed, in the longitudinal direction of the section; and a second R portion $R_2$ that has a curved surface and is formed in the other end portion of the opposite end portions, between which the flat portion P is interposed, in the longitudinal direction of the section. In regard to the positional relationship between the first R portion $R_1$ and the second R portion $R_2$, the second R portion $R_2$ is set on a side that is positioned on the bottom side (lower surface side) of the battery case 10 when the nonaqueous electrolytic solution is put into the battery case 10 at least in a battery construction step.

The flat wound electrode body 20 may be formed by pressing a cylindrically wound electrode body to be squashed in a direction perpendicular to the winding axis W. Alternatively, the flat wound electrode body 20 may be formed by setting a plate shape as a winding start point and winding the periphery of the plate shape into a flat shape.

When the positive electrode 30, the negative electrode 40, and the separator 50 are laminated, the positive electrode 30 and the negative electrode 40 may overlap each other after being shifted from each other in the width direction such that the positive electrode current collector exposure portion 33 of the positive electrode 30 and the negative electrode current collector exposure portion 43 of the negative electrode 40 protrude from opposite sides of the separator 50 in the width direction, respectively. As a result, the positive electrode current collector exposure portion 33 and the negative electrode current collector exposure portion 43 protrude to the outside from winding core portions (that is, the active material layers 34, 44 of the positive and negative electrodes are opposite each other) in a winding axis W direction of the flat wound electrode body 20.

Figure 2:
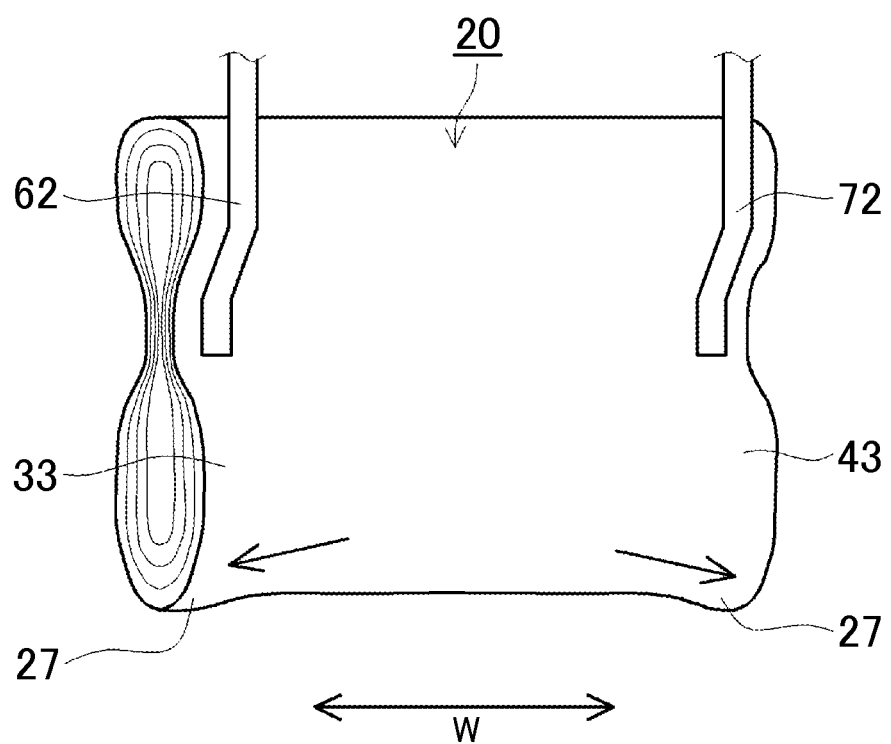
FIG. 2 is a perspective view schematically showing an external appearance of the flat wound electrode body of the nonaqueous electrolyte secondary battery according to the embodiment.

As shown in FIG. 2, in the positive electrode current collector exposure portion 33 and the negative electrode current collector exposure portion 43, current collector portions are formed near the centers thereof in the longitudinal direction of the section of the electrode body perpendicular to the winding axis W. Specifically, a positive electrode current collector member 62 is joined to the positive electrode current collector exposure portion 33 by ultrasonic welding, and a joint portion therebetween functions as a current collector portion. A negative electrode current collector member 72 is joined to the negative electrode current collector exposure portion 43 by resistance welding, and a joint portion therebetween functions as a current collector portion. As shown in FIG. 2, these current collector portions are formed by the positive electrode current collector exposure portion 33 and the negative electrode current collector exposure portion 43 being biased (compressed) in a transverse direction of the section of the electrode body.

As shown in FIG. 2, in the flat wound electrode body 20 according to the embodiment, opposite end portions of the second R portion in the winding axis W direction (hereinafter, also referred to as "lower opposite end portions 27") are pressed to be squashed in a thickness direction of the flat wound electrode body 20 (that is, in the transverse direction of the section of the electrode body). Typically, a step of pressing the lower opposite end portions 27 of the flat wound electrode body 20 to be squashed is performed after the construction of the flat wound electrode body 20 shown in FIG. 1. Typically, the opposite end portions (lower opposite end portions 27) which are pressed to be squashed as described above are formed on only the positive electrode current collector exposure portion 33 or the negative electrode current collector exposure portion 43. However, the lower opposite end portions 27 may be formed on a part of the winding core portion in addition to the exposure portions 33, 43.

By pressing (squashing) the lower opposite end portions 27 of the flat wound electrode body 20 in the thickness direction, opposite end surfaces of the flat wound electrode body 20 in the winding axis W direction (that is, a positive electrode end surface which is an end surface when seen from the positive electrode side, and a negative electrode end surface which is an end surface when seen from the negative electrode side) can be formed into a desirable shape as described below. At this time, the distance between portions of the electrodes adjacent to each other in the lower opposite end portions 27 (that is, the distance between the current collectors adjacent to each other) may be shorter than that of the other portions, and the lower opposite end portions are in a closed state. Due to the compression, the top (lower end) of the lower opposite end portions 27 can be gradually inclined downward from the center toward the opposite end portions in the winding axis W direction.

In this way, by reducing the distance between the portions of the electrodes adjacent to each other in the lower opposite end portions 27 of the flat wound electrode body 20, the volume of a space where the residue of the nonaqueous electrolytic solution may accumulate can be reduced. Therefore, according to the above-described configuration, the residue of the nonaqueous electrolytic solution flows out of the flat wound electrode body 20 favorably. When the top of the lower opposite end portions 27 are formed to be inclined as described above, the residue of the nonaqueous electrolytic solution is likely to flow out of the flat wound electrode body 20 naturally under the action of gravity. Due to the above-described reasons, problems (for example, the surfaces of the electrodes may be covered with a component which is produced by continuous decomposition of the residue of the nonaqueous electrolytic solution on a surface of the negative electrode) caused by the accumulation of the residue of the nonaqueous electrolytic solution in a lower portion (in particular, the lower opposite end portions 27) of the flat wound electrode body 20 are suppressed.

Figure 5:
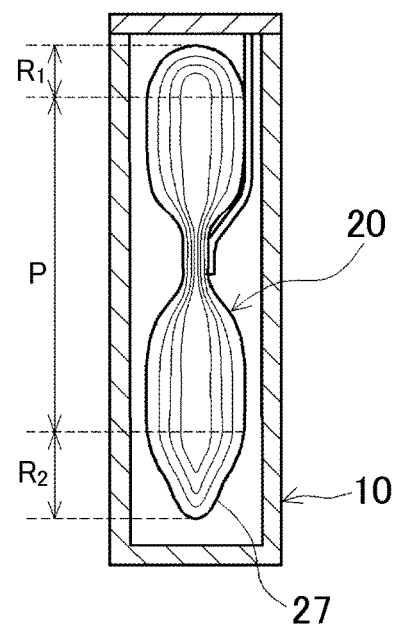
FIG. 5 is a diagram schematically showing a positive electrode end surface of the flat wound electrode body of the nonaqueous electrolyte secondary battery according to the embodiment.
Figure 6:
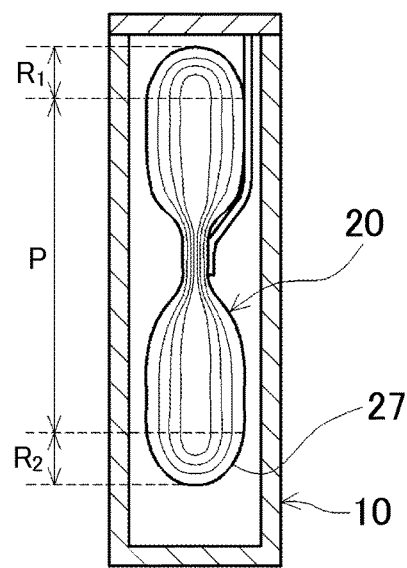
FIG. 6 is a diagram schematically showing the positive electrode end surface of the flat wound electrode body of the nonaqueous electrolyte secondary battery in a stage before lower opposite end portions described below are squashed.

The shape of the flat wound electrode body 20 according to the embodiment will be further described using FIGS. 5 to 8. FIG. 5 shows the positive electrode end surface on the positive electrode side among the end surfaces of the flat wound electrode body 20 shown in FIG. 2 in the winding axis W direction. FIG. 6 shows the positive electrode end surface on the positive electrode side among the end surfaces of the flat wound electrode body 20 in the winding axis W direction, in a stage before the lower opposite end portions 27 of the flat wound electrode body 20 are pressed to be squashed. Hereinafter, the description will be made with reference to the positive electrode end surface of the flat wound electrode body 20. It is preferable that the negative electrode end surface on the negative electrode side has the same shape as the positive electrode end surface.

As can be seen from FIG. 6, before the lower opposite end portions 27 of the flat wound electrode body 20 are squashed, the shape of the second R portion $R_2$ has substantially the same shape as the first R portion $R_1$ although they are vertically symmetric. On the other hand, as shown in FIG. 5, after the lower opposite end portions 27 of the flat wound electrode body 20 are squashed in the thickness direction, the shape of the second R portion $R_2$ typically extends downward and become elongated.

Figure 7:
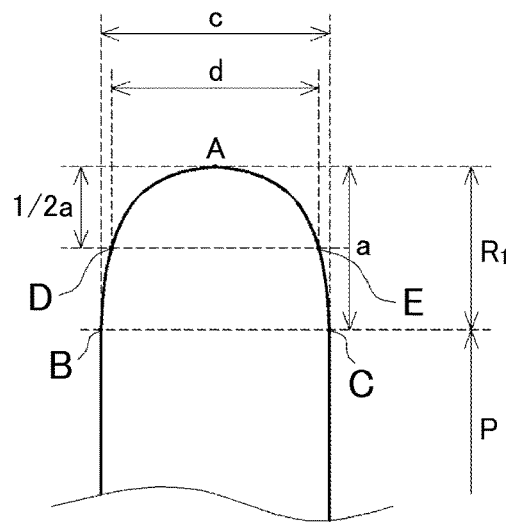
FIG. 7 is a diagram schematically showing a shape of a first R portion ($R_1$) in FIG. 5.
Figure 8:
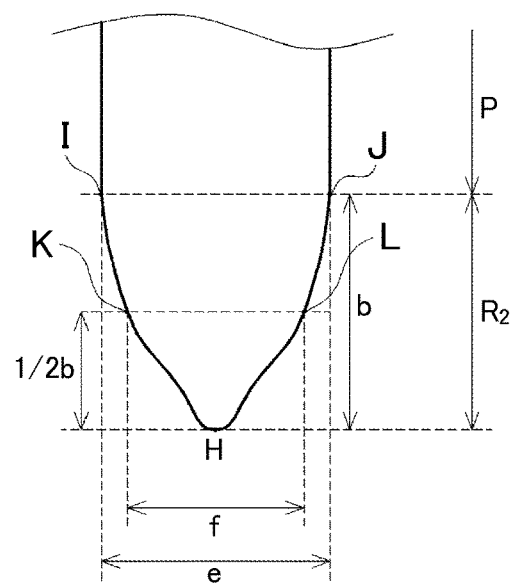
FIG. 8 is a diagram schematically showing a shape of a second R portion ($R_2$) in FIG. 5.

FIGS. 7 and 8 are enlarged diagrams showing the outer peripheries of the first R portion $R_1$ and the second R portion $R_2$ of the flat wound electrode body 20 shown in FIG. 5, respectively. Here, as shown in FIG. 7, on the positive electrode end surface, a top of the first R portion $R_1$ is set as a point A, boundary points of the first R portion $R_1$ and the flat portion P are set as points B and C, and a boundary surface including the point B and the point C is set as a cross section B-C. Here, as shown in FIG. 8, on the outer periphery of the positive electrode end surface, a top of the second R portion $R_2$ is set as a point H, boundary points of the second R portion $R_2$ and the flat portion P are set as points I and J, and a boundary surface including the point I and the point J is set as a cross section I-J.

In an aspect of the flat wound electrode body 20 according to the embodiment, it is preferable that a distance a from the cross section B-C to the point A and a distance b from the cross section I-J to the point H satisfies a<b. According to the flat wound electrode body 20 having the above-described configuration, the distance between the portions of the electrodes which constitute the electrode body in or near the opposite end portions of the second R portion is appropriate, and the accumulation of an excess amount of the residue of the nonaqueous electrolytic solution in the opposite end portions can be suppressed.

In FIG. 7, a surface parallel to the cross section B-C at a distance (0.5×a), which is half of the distance a from the cross section B-C to the point A, is set as a cross section D-E. In FIG. 8, a surface parallel to the cross section I-J at a distance (0.5×b), which is half of the distance b from the cross section I-J to the point H, is set as a cross section K-L. In another aspect of the flat wound electrode body 20 according to the embodiment, it is preferable that the flat wound electrode body 20 is configured such that a length c of the cross section B-C in the thickness direction of the electrode body, a length d of the cross section D-E in the thickness direction of the electrode body, a length e of the cross section I-J in the thickness direction of the electrode body, and a length f of the cross section K-L in the thickness direction of the electrode body satisfy the following relationship of (d/c)>(f/e). It is more preferable that the flat wound electrode body 20 is configured such that the following expression of (d/c)≥1.2×(f/e) is satisfied. It is still more preferable that the flat wound electrode body 20 is configured such that the following expression of (d/c)≥1.5× (f/e) is satisfied. According to the flat wound electrode body 20 having the above-described configuration, the distance between the portions of the electrodes which constitute the electrode body in or near the opposite end portions of the second R portion is appropriate, and the accumulation of an excess amount of the residue of the nonaqueous electrolytic solution in the opposite end portions can be suppressed.

As a result of study by the present inventors, it was found that, according to the nonaqueous electrolyte secondary battery 100 including the flat wound electrode body 20 in which at least one of the positive electrode end surface and the negative electrode end surface (preferably, both end surfaces) have a shape satisfying the above-described conditions, the electrical resistance value in the lower portion (in particular, the lower opposite end portions 27) of the flat wound electrode body 20 is likely to decrease.

<Nonaqueous Electrolytic Solution>

As the nonaqueous electrolytic solution used in the nonaqueous electrolyte secondary battery according to the embodiment, typically, a solution in which a supporting electrolyte (for example, in a lithium ion secondary battery, a lithium salt) is dissolved or dispersed in a nonaqueous solvent can be used. As the nonaqueous solvent, various organic solvents which can be used in an electrolytic solution of a general nonaqueous electrolyte secondary battery, for example, carbonates, ethers, esters, nitriles, sulfones, and lactones can be used without any limitation. Specific examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or a mixed solvent of two or more kinds can be used.

In a lithium ion secondary battery, as the supporting electrolyte, lithium salts such as $LiPF_6$, $LiBF_4$, $LiClO_4$, $LiAsF_6$, $Li(CF_3SO_2)_2N$, and $LiCF_3SO_3$ can be used. Among these supporting electrolytes, one kind can be used alone, or two or more kinds can be used in combination. It is preferable that the supporting electrolyte is used such that the concentration thereof in the nonaqueous electrolyte is within a range of 0.7 mol/L to 1.3 mol/L.

The nonaqueous electrolytic solution may further contain various additives as long as the characteristics of the nonaqueous electrolyte secondary battery according to the invention do not deteriorate. These additives are used as a film forming agent, an overcharge additive, and the like for one or two or more of the purposes including: the improvement of the input and output characteristics of the battery; the improvement of cycle characteristics; the improvement of an initial charge-discharge efficiency; and the improvement of safety. Examples of the additives include a film forming agent such as lithium bis(oxalato)borate (LiBOB), vinylene carbonate (VC), vinyl ethylene carbonate (VEC), or fluoroethylene carbonate (FEC); an overcharge additive formed of a compound which may produce gas during overcharge, the additive being represented by an aromatic compound such as biphenyl (BP) or cyclohexylbenzene (CHB); a surfactant; a dispersant; a thickener; and an antifreezing agent. The contents of these additives in the nonaqueous electrolytic solution vary depending on the kind of the additive. For example, the content of the film forming agent is usually 0.1 mol/L or less (typically, 0.005 mol/L to 0.05 mol/L), and the content of the overcharge additive is usually about 6 wt % or less (typically, 0.5 wt % to 4 wt %).

<Battery Case>

As shown in FIGS. 2, 3, and 4, for example, the battery case 10 includes: a quadrilateral case body 12 that has an opening into which the flat wound electrode body 20 is inserted; and a sealing lid 14 that seals the opening of the case body 12. The battery case 10 can be preferably formed of various materials, for example, metals such as aluminum and an alloy thereof and iron and an alloy thereof; resins such as polyamide; and laminated films. In an example of FIG. 3, the case body (external case) 12 is a thin rectangle member formed of an aluminum alloy and has a flat bottomed box shape (typically, a cuboid shape) having an opening on an upper surface thereof. On the sealing lid 14, a positive electrode terminal 60, which is electrically connected to the positive electrode current collector exposure portion 33 of the wound electrode body 20 through the positive electrode current collector member 62, and the negative electrode terminal 70, which is electrically connected to the negative electrode current collector exposure portion 43 of the wound electrode body 20 through the negative electrode current collector member 72, are provided. As in a case of a nonaqueous electrolyte secondary battery of the related art, the sealing lid 14 may further include a safety valve 36 for discharging gas, produced from the inside of the battery case 10, to the outside of the battery case 10 during an abnormal situation of the battery. When the wound electrode body 20 is accommodated in the case body 12 in a state of being fixed to the sealing lid 14, the accommodation position is stable, and defects such as fracturing can be reduced, which is preferable.

In the example shown in FIG. 3, when the battery case 10 is arranged on a horizontal plane such that the sealing lid 14 faces upward, the wound electrode body 20 is accommodated in the battery case 10 such that the longitudinal direction of the section of the electrode body is a vertical direction. In other words, the wound electrode body 20 is accommodated in the battery case 10 such that the winding axis W is in a substantially horizontal direction. In this state, when the nonaqueous electrolytic solution is put into the battery case 10, the winding axis W direction, which is an impregnation direction of the nonaqueous electrolytic solution, is substantially horizontal, the impregnation of the nonaqueous electrolytic solution progresses smoothly, and the time required for the impregnation of the nonaqueous electrolytic solution can be reduced, which is preferable. The sealing between the opening of the case body 12 and the sealing lid 14 can be suitably performed by laser welding or the like.

The nonaqueous electrolyte secondary battery 100 can be used in the form of a battery pack in which, typically, plural nonaqueous electrolyte secondary batteries are connected to each other in series and/or in parallel. In this case, it is preferable that the nonaqueous electrolyte secondary batteries are restrained such that a pressure of 1 kN to 10 kN is applied to the flat portion P of the flat wound electrode body 20. As a result, the distance between the current collectors of the positive electrode and the negative electrode can be reduced, and high output is likely to be obtained. Typically, in the battery pack which is constructed using the nonaqueous electrolyte secondary battery according to the embodiment as a single cell, the flat portion P is defined as the center portion to which the restraining pressure is applied, and the first R portion $R_1$ and the second R portion $R_2$ are defined as end portions to which the restraining pressure is not applied.

The nonaqueous electrolyte secondary battery according to the embodiment can be used in various applications. In particular, the nonaqueous electrolyte secondary battery according to the embodiment can be suitably applicable to a large-sized lithium ion secondary battery in which high output is required. Accordingly, the nonaqueous electrolyte secondary battery according to the embodiment can be preferably used in applications in which high energy density, high input and output densities, and the like are required and in applications in which high reliability is required. Examples of the applications include driving power supplies mounted in vehicles such as a plug-in hybrid vehicle (PHV), a hybrid vehicle (HV), and an electric vehicle (EV).

Hereinafter, several examples relating to the invention will be described, but the examples according to the invention are not intended to limit the invention.

Embodiment 1

[Construction of Lithium Ion Secondary Battery for Evaluation]
[Positive Electrode]

$LiNi_{1/3}Co_{1/3}Mn_{1/3}O_2$ (NCM, average particle size: 6 µm, specific surface area: 0.7 m$^2$/g) as a positive electrode active material; acetylene black (AB) as a conductive material; polyvinylidene fluoride (PVdF) as a binder were weighed such that a weight ratio (NCM:AB:PVdF) of the materials was 91:6:3. N-methylpyrrolidone (NMP) was added to the weighed components such that the solid content concentration (NV) was about 50 wt %, and the solution was kneaded. As a result, a slurry for forming a positive electrode active material layer was prepared. This slurry was applied in a belt shape to a region having a width of about 94 mm from one end portion in the longitudinal direction on both surfaces of belt-shaped aluminum foil having a thickness of 15 µm, which was a positive electrode current collector, such that the coating weight per single surface was 13.5 mg/cm$^2$. Next, the applied slurry was dried (drying temperature: 80° C., 5 minutes). As a result, a positive electrode sheet including a positive electrode active material layer was prepared. In the other end portion of the positive electrode sheet in the longitudinal direction, a current collector exposure portion where the positive electrode active material layer was not formed was set. The positive electrode active material layer was roll-pressed such that the density of the positive electrode active material layer was about 2.6 g/cm$^3$. After being roll-pressed, the thickness of the positive electrode active material layer per single surface was about 50 µm (115 µm in the entire positive electrode).

[Negative Electrode]

Next, graphite (C, average particle size: 25 µm, specific surface area: 2.5 m$^2$/g) as a negative electrode active material; styrene-butadiene rubber (SBR) as a binder; and carboxymethyl cellulose (CMC) as a thickener were weighed such that a weight ratio (C:SBR:CMC) of the materials was 98:1:1. The weighed materials were kneaded after adding ion exchange water thereto. As a result, a slurry for forming a negative electrode active material layer was prepared. This slurry was applied in a belt shape to a region having a width of about 100 mm from one end portion in the longitudinal direction on both surfaces of belt-shaped copper foil having a thickness of 10 µm, which was a negative electrode current collector, such that the coating weight per single surface was 7.3 mg/cm$^2$. Next, the applied slurry was dried (drying temperature: 100° C., 5 minutes). As a result, a negative electrode sheet including a negative electrode active material layer was prepared. In the other end portion of the negative electrode sheet in the longitudinal direction, a current collector exposure portion where the negative electrode active material layer was not formed was set. The negative electrode active material layer was roll-pressed such that the density of the negative electrode active material layer was about 1.1 g/cm$^3$. After being roll-pressed, the thickness of the negative electrode active material layer per single surface was about 60 µm (130 µm in the entire negative electrode).

As a separator, a separator having a width of 105 mm and a thickness of 25 µm was used. As a substrate of the separator, a belt-shaped microporous sheet having a three-layer structure (PP/PE/PP) in which a polypropylene (PP) layer was formed on both surfaces of a polyethylene (PE) layer was used.

The positive electrode and the negative electrode prepared as above were made to overlap each other with the separator interposed therebetween and were wound in an elliptical shape in section. At this time, the positive electrode and the negative electrode were arranged such that the negative electrode active material layer covered the positive electrode active material layer in the width direction and such that the positive electrode current collector exposure portion and the negative electrode current collector exposure portion protruded to different sides in the width direction. The separator was arranged such that the positive and negative active material layers were insulated from each other. The wound body was pressed into a flat shape with a flat plate at a pressure of 4 kN/cm$^2$ and at a normal temperature (25° C.) for 1 minute. Opposite end portions of the second R portion of the wound body in the winding axial direction were pressed with a flat plate in the thickness direction for 1 minute at a pressure of 4 kN/cm$^2$. At this time, it was verified by visual inspection that a lower end of the wound body was inclined downward to the opposite end portions in the winding axial direction. In the measurement of the shape of an end surface (positive electrode end surface) of the formed flat wound electrode body when seen from the positive electrode side, the results were as follows: a=5.6 mm, b=7.0 mm, d/c=0.85, and f/e=0.56 (that is, (d/c)=1.5×(f/e)).

Next, the flat wound electrode body was accommodated in a battery case. The battery case included: an aluminum battery case body having a thin quadrilateral shape (width 150 mm×height 90 mm×thickness 26 mm) that had an opening at an upper surface thereof; and a sealing lid that sealed the opening of the battery case body. Next, a positive electrode terminal and a negative electrode terminal were attached to the sealing lid, and these terminals were respectively welded to the positive electrode current collector exposure portion and the negative electrode current collector exposure portion, protruding from the wound electrode body, through current collector terminals. The attachment positions of the current collector terminals were center positions of the flat wound electrode body in the longitudinal direction of the section. The wound electrode body connected to the sealing lid was put into the battery case body through the opening thereof, and the opening and the sealing lid were welded (sealed). That is, the flat wound electrode body was accommodated in the battery case such that the winding axis W was in an in-plane direction (that is, horizontal) of the sealing lid.

As the nonaqueous electrolytic solution, a solution was used in which $LiPF_6$ as a supporting electrolyte was dissolved in a mixed solvent at a concentration of 1.0 mol/L, the mixed solvent containing ethylene carbonate (EC), dimethyl carbonate (DMC), and ethyl methyl carbonate (EMC) at a volume ratio (EC:DMC:EMC) of 3:4:3. About 45 g of the nonaqueous electrolytic solution was put to the battery case through a liquid injection hole provided on the sealing lid. As a result, a lithium ion secondary battery (assembly) of Example 1 was constructed.

Embodiment 2

A lithium ion secondary battery (assembly) of Example 2 was constructed using the same method as the method of the lithium ion secondary battery according to Example 1, except that the opposite end portions of the second R portion of the flat wound electrode body in the winding axial direction were not squashed. In the measurement of the shape of an end surface of the flat wound electrode body according to Example 2 when seen from the positive electrode side, the results were as follows: a=40 mm, b=40 mm (that is, about a=b), d/c=0.85, and f/e=0.85 (that is, (d/c)=(f/e)).

[Measurement of Negative Electrode Resistance]

Figure 9:
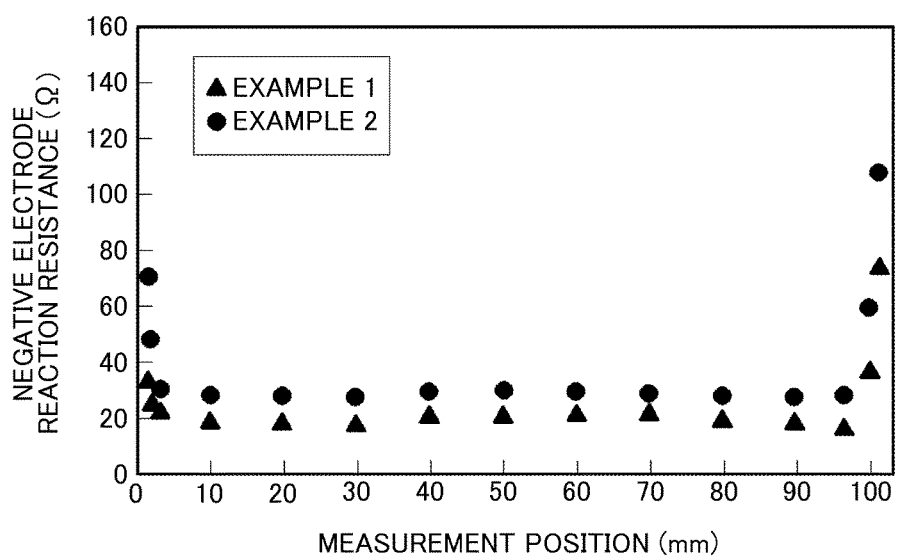
FIG. 9 is a graph showing a negative electrode reaction resistance in each of nonaqueous electrolyte secondary batteries according to Examples 1 and 2.

Each of the lithium ion secondary batteries according to Examples 1 and 2 prepared as described above was charged at a charging rate of 0.1 C at 25° C. until the voltage between the positive and negative electrode terminals reached 4.1 V, and the charging operation was stopped for 10 minutes. Next, the battery was discharged at a discharging rate of 0.1 C until the voltage reached 3.0 V. These charging and discharging operations were repeated three times as a conditioning treatment. A resistance distribution in the negative electrode of the lithium ion secondary battery was investigated. Specifically, first, after being discharged such that the open-circuit voltage reached 3.0 V, each of the lithium ion secondary batteries according to Examples 1 and 2 was disassembled in a glove box in a dry environment to extract the flat wound electrode body therefrom. Next, a portion (corresponding to the lower portion of the electrode body) of the outermost periphery of the negative electrode of the flat wound electrode body was cut, and this cut portion was dipped in EMC used as a nonaqueous electrolytic solution for about 10 minutes, and was washed. As a result, a specimen for resistance measurement was prepared. The reaction resistance of the surface of the negative electrode active material layer formed in the negative electrode specimen was measured along the winding axial direction (corresponding to the width direction of the elongated negative electrode) using a AC impedance method. The resistance was measured using the AC impedance method according to the method disclosed in Japanese Patent Application Publication No. 2014-25850 (JP 2014-25850 A). The measurement positions were set on a line segment along the winding axial direction at a height of 10 mm from the lower end of the wound electrode body. A change in the negative electrode reaction resistance in the winding axial direction measured as described above is shown in FIG. 9. In FIG. 9, the horizontal axis represents the positions of the negative electrode active material layer in the winding axial direction. Specifically, "0 mm" at the left end of the horizontal axis represents the position of the end portion of the negative electrode active material layer 44 in the winding axial direction on the positive electrode current collector exposure portion 33 side. "100 mm" at the right end represents the position of the end portion of the negative electrode active material layer 44 in the winding axial direction on the negative electrode current collector exposure portion 43 side.

It was found from the results shown in FIG. 9 that the negative electrode reaction resistance of the second R portion according to Example 2 was rapidly increased, in particular, at the left end and the right end (that is, the opposite end portions of the negative electrode active material layer in the winding axial direction) of the measurement positions (horizontal axis). On the other hand, it was found that the negative electrode reaction resistance of the second R portion according to Example 1 was clearly suppressed to be low in the opposite end portions in the winding axial direction. For example, when the negative electrode resistance values at a measurement position of 1 mm (left end) were compared to each other, the value of Example 1 was 35Ω, and the value of Example 2 was 72Ω. It was found that the negative electrode reaction resistance according to Example 1 was about 50% of that of Example 2. For example, when the negative electrode resistance values at a measurement position of 102 mm (right end) were compared to each other, the value of Example 1 was 77Ω, and the value of Example 2 was 109Ω. It was found that the negative electrode reaction resistance according to Example 1 was about 70% of that of Example 2. The reason why the negative electrode reaction resistance according to the invention was significantly decreased in the opposite end portions of the wound electrode body in the winding axial direction is considered to be as follows: according to the nonaqueous electrolyte secondary battery of the invention, in the opposite end portions where the residue of the nonaqueous electrolytic solution was more likely to accumulate, the residue was appropriately discharged to the outside of the flat wound electrode body (an excess amount of the nonaqueous electrolytic solution was not penetrated into or held in the wound electrode body). It was verified that, in all the measurement positions (that is, the entire region of the lower portion of the electrode body in the winding axial direction), the negative electrode reaction resistance of the second R portion according to the Example 1 was suppressed to be lower than the negative electrode reaction resistance according to Example 2.

Hereinabove, specific examples of the invention have been described in detail. However, these examples are merely exemplary and do not limit the invention. The invention includes various modifications and alternations of the above-described specific examples.

What is claimed is:

1. A nonaqueous electrolyte secondary battery comprising:
a quadrilateral battery case;
a flat wound electrode body that is accommodated in the quadrilateral battery case, the flat wound electrode body being formed by making an elongated belt-shaped positive electrode and an elongated belt-shaped negative electrode overlap each other with an elongated belt-shaped separator interposed therebetween to obtain a laminate and winding the laminate in a longitudinal direction of the positive electrode and the negative electrode, in which the flat wound electrode body has a flat portion, a first R portion, and a second R portion, the flat portion has a flat surface and is provided in a center portion in a longitudinal direction of a section of the electrode body perpendicular to a winding axis, the first R portion and the second R portion have a curved surface and are provided in opposite end portions, between which the flat portion is interposed, in the longitudinal direction of the section, the second R portion is provided on a bottom side of the quadrilateral battery case, and opposite end portions of the second R portion in a winding axial direction are squashed in a thickness direction of the electrode body to a larger extent than opposite end portions of the first R portion in the winding axial direction, and wherein the opposite end portions of the second R portion protrude towards the bottom of the battery case so as to be disposed closer to the bottom of the battery case than a center portion of the second R portion in the winding axial direction; and a nonaqueous electrolytic solution that is accommodated in the quadrilateral battery case.

2. The nonaqueous electrolyte secondary battery according to claim 1, wherein when a top of the opposite end portions of the first R portion in the longitudinal direction of the section is represented by a point A, a boundary surface between the first R portion and the flat portion is represented by a cross section B-C, a top of the opposite end portions of the second R portion in the longitudinal direction of the section is represented by a point H, and a boundary surface between the second R portion and the flat portion is represented by a cross section I-J, a relationship between a distance a from the cross section B-C to the point A and a distance b from the cross section I-J to the point H satisfies $a<b$.

3. The nonaqueous electrolyte secondary battery according to claim 2, wherein when a length of the cross section B-C in the thickness direction of the electrode body in the opposite end portions of the first R portion is represented by c, a length of a cross section D-E parallel to the cross section B-C at a distance, which is half of the distance a from the cross section B-C to the point A, in the thickness direction of the electrode body is represented by d, a length of the cross section I-J in the thickness direction of the electrode body in the opposite end portions of the second R portion is represented by e, and a length of a cross section K-L parallel to the cross section I-J at a distance, which is half of the distance b from the cross section I-J to the point H, in the thickness direction of the electrode body is represented by f, a relationship of $d/c > f/e$ is satisfied.

4. The nonaqueous electrolyte secondary battery according to claim 3, wherein a relationship between the length c, the length d, the length e, and the length f satisfies $d/c \geq 1.2 \times f/e$.

\* \* \* \* \*